United States Patent [19]
Mohabir

[11] Patent Number: 5,794,996
[45] Date of Patent: Aug. 18, 1998

[54] SPATULA

[76] Inventor: Tota Mohabir, 283 Pharmacy Avenue, Scarborough, Ontario, Canada, M1L 3G1

[21] Appl. No.: 903,603

[22] Filed: Jul. 31, 1997

[51] Int. Cl.[6] .................................................. A47J 43/28
[52] U.S. Cl. .................................................................. 294/7
[58] Field of Search ........................ 294/7, 8, 49, 50, 294/55, 56; 15/236.01, 236.07; 30/124, 142, 169, 325; D7/688, 691, 692

[56] References Cited

U.S. PATENT DOCUMENTS

| D. 108,076 | 1/1938 | Hess | D7/692 |
|---|---|---|---|
| D. 108,078 | 1/1938 | Hess | D7/692 |
| D. 190,513 | 6/1961 | Carroll | D7/692 |
| D. 203,616 | 2/1966 | Hvale | D7/692 |
| D. 204,789 | 5/1966 | Jackson | D7/692 |
| D. 298,792 | 12/1988 | Tucker et al | D7/692 |
| D. 309,700 | 8/1990 | Goetz | D7/692 |
| D. 312,029 | 11/1990 | Dumbrell | D7/692 |
| D. 331,686 | 12/1992 | Persson | D7/688 X |
| 2,064,136 | 12/1936 | Winger | 294/7 |
| 4,711,029 | 12/1987 | Somerset | 294/7 X |

*Primary Examiner*—Johnny D. Cherry

[57] ABSTRACT

A new spatula for more easily removing food from a cooking surface. The inventive device includes a spatula head member with a plurality of drainage slots extending through it. A handle member is attached to the rear end portion of the spatula head member. Extending from the upper surface of the spatula head member is a ridge to abut against food and halt its slide up the spatula. The lateral sides of the spatula head portion are flared from the rear end portion towards the front edge portion of the spatula head member to give a greater amount of surface area while maintaining usability.

8 Claims, 2 Drawing Sheets

SPATULA

BACKGROUND OF THE INVENTION

1. Field of the Invention

The present invention relates to spatulas and more particularly pertains to a new spatula for more easily removing food from a cooking surface.

2. Description of the Prior Art

The use of spatulas is known in the prior art. More specifically, spatulas heretofore devised and utilized are known to consist basically of familiar, expected and obvious structural configurations, notwithstanding the myriad of designs encompassed by the crowded prior art which have been developed for the fulfillment of countless objectives and requirements.

Known prior art spatulas include U.S. Pat. No. 4,848,816; U.S. Pat. No. Des. 268,243; U.S. Pat. No. Des. 254,766; U.S. Pat. No. Des. 293,064; U.S. Pat. No. Des. 345,491; and U.S. Pat. No. Des. 275,065.

While these devices fulfill their respective, particular objectives and requirements, the aforementioned patents do not disclose a new spatula. The inventive device includes a spatula head member with a plurality of drainage slots extending through it. A handle member is attached to the rear end portion of the spatula head member. Extending from the upper surface of the spatula head member is a ridge to abut against food and halt its slide up the spatula. The lateral sides of the spatula head portion are flared from the rear end portion towards the front edge portion of the spatula head member to give a greater amount of surface area while maintaining usability.

In these respects, the spatula according to the present invention substantially departs from the conventional concepts and designs of the prior art, and in so doing provides an apparatus primarily developed for the purpose of more easily removing food from a cooking surface.

SUMMARY OF THE INVENTION

In view of the foregoing disadvantages inherent in the known types of spatulas now present in the prior art, the present invention provides a new spatula construction wherein the same can be utilized for more easily removing food from a cooking surface.

The general purpose of the present invention, which will be described subsequently in greater detail, is to provide a new spatula apparatus and method which has many of the advantages of the spatulas mentioned heretofore and many novel features that result in a new spatula which is not anticipated, rendered obvious, suggested, or even implied by any of the prior art spatulas, either alone or in any combination thereof.

To attain this, the present invention generally comprises a spatula head member with a plurality of drainage slots extending through it. A handle member is attached to the rear end portion of the spatula head member. Extending from the upper surface of the spatula head member is a ridge to abut against food and halt its slide up the spatula. The lateral sides of the spatula head portion are flared from the rear end portion towards the front edge portion of the spatula head member to give a greater amount of surface area while maintaining usability.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new spatula apparatus and method which has many of the advantages of the spatulas mentioned heretofore and many novel features that result in a new spatula which is not anticipated, rendered obvious, suggested, or even implied by any of the prior art spatulas, either alone or in any combination thereof.

It is another object of the present invention to provide a new spatula which may be easily and efficiently manufactured and marketed.

It is a further object of the present invention to provide a new spatula which is of a durable and reliable construction.

An even further object of the present invention is to provide a new spatula which is susceptible of a low cost of manufacture with regard to both materials and labor, and which accordingly is then susceptible of low prices of sale to the consuming public, thereby making such spatula economically available to the buying public.

Still yet another object of the present invention is to provide a new spatula which provides in the apparatuses and methods of the prior art some of the advantages thereof, while simultaneously overcoming some of the disadvantages normally associated therewith.

Still another object of the present invention is to provide a new spatula for more easily removing food from a cooking surface.

Yet another object of the present invention is to provide a new spatula which includes a spatula head member with a plurality of drainage slots extending through it. A handle member is attached to the rear end portion of the spatula head member. Extending from the upper surface of the spatula head member is a ridge to abut against food and halt its slide up the spatula. The lateral sides of the spatula head portion are flared from the rear end portion towards the front edge portion of the spatula head member to give a greater amount of surface area while maintaining usability.

Still yet another object of the present invention is to provide a new spatula that overcomes the inherent problem of pushing food across a cooking surface through its new design.

Even still another object of the present invention is to provide a new spatula that can remove food without damaging the physical appearance of delicate foods or scratching the cooking surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
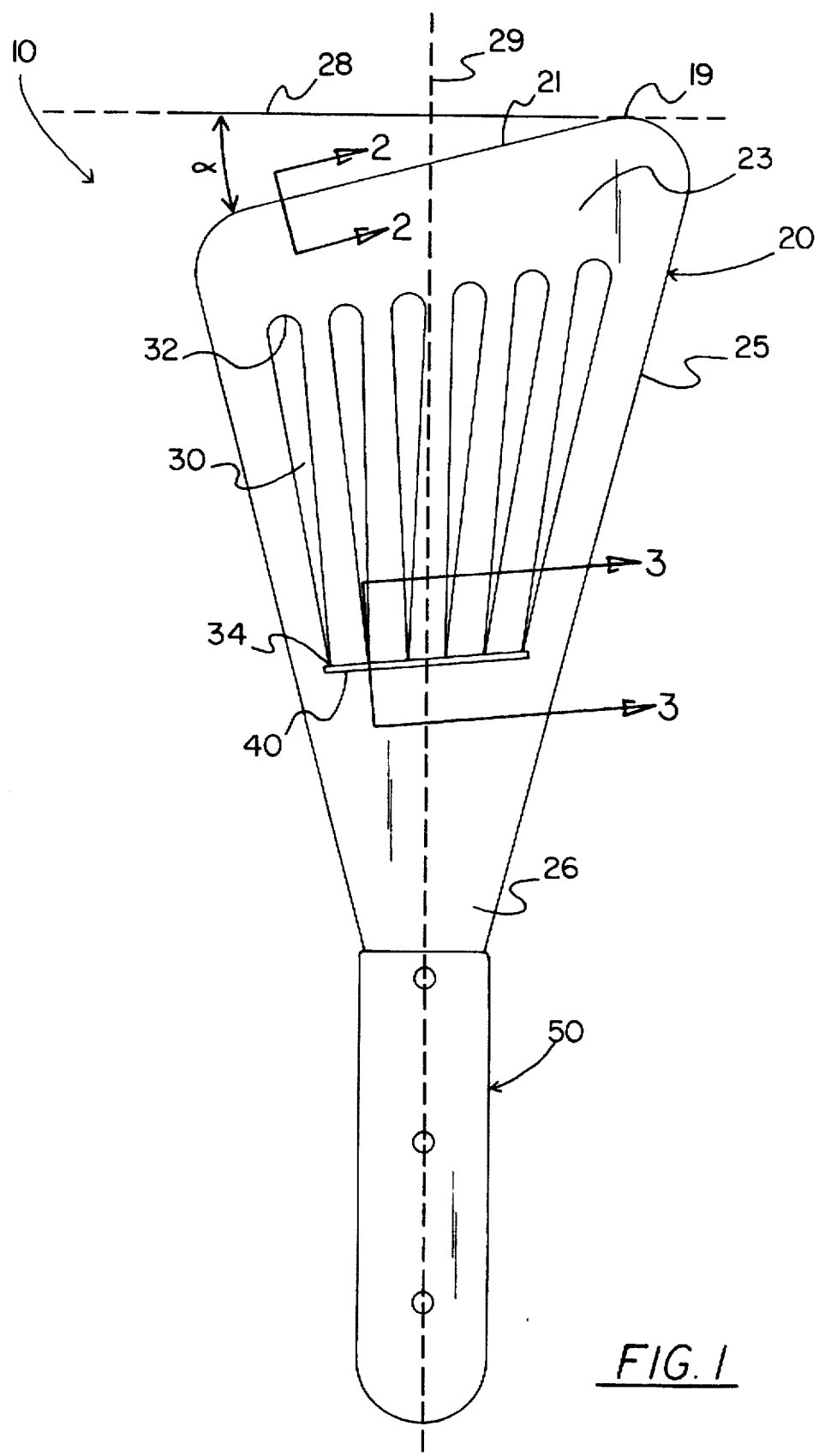
FIG. 1 is a top plan view of a new spatula according to the present invention.
Figure 2:
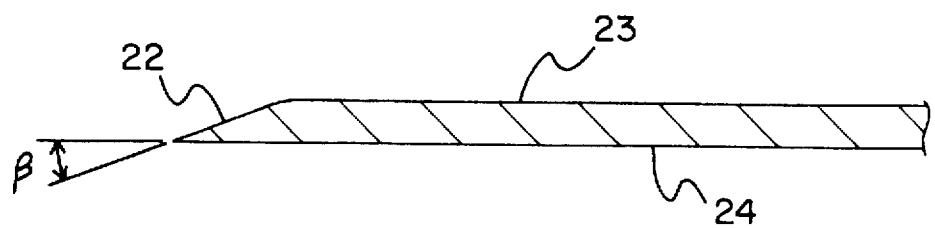
FIG. 2 is a sectional view of the front edge of the present invention taken from line 2—2 of FIG. 1.
Figure 3:
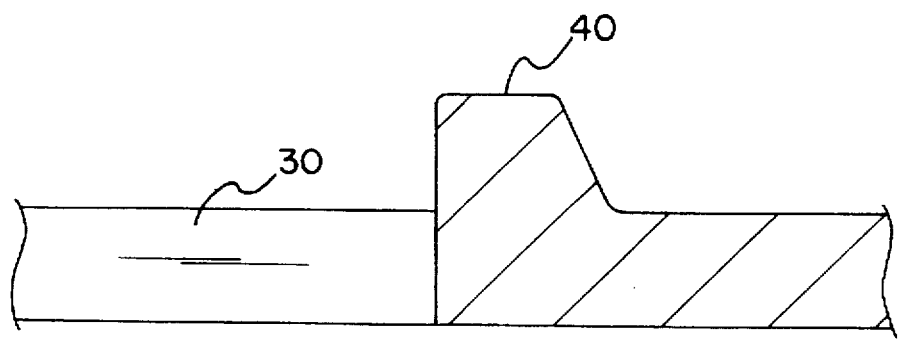
FIG. 3 is a sectional view of the ridge and the drainage slot of the present invention taken from line 3—3 of FIG. 1.

With reference now to the drawings, and in particular to FIGS. 1 through 3 thereof, a new spatula embodying the principles and concepts of the present invention and generally designated by the reference numeral 10 will be described.

As best illustrated in FIGS. 1 through 3, the spatula 10 comprises a spatula head member 20 having a plurality of drainage slots 30, a ridge 40 extending from the upper surface 23 of the spatula head 20 to abut against food and halt its slide up the spatula 10, and a handle member 50 attached to the rear end portion 26 of the spatula head member 20.

The spatula head member 10 has a front edge 21, a pair of lateral sides 25, and a rear end portion 26. Preferably, the spatula head member 20 has a transverse axis 28 that is substantially perpendicular to a longitudinal axis 29.

The front edge 21 is orientated at an angle α from the transverse axis 28 creating a leading region 19 of the front edge 21. Ideally, the angle α between the front edge 21 and the transverse axis 28 is between about one degree and about fifty degrees. Even more ideally, the angle α is fifteen degrees. The leading region 19 of the front edge 21 goes under food first to help insertion of the spatula head member 20 under the food in a gentle, non-pushing manner.

The lateral sides 25 are flared from the rear end portion 26 to the front edge 21. Such a design gives a greater amount of surface area while maintaining usability. As an illustrative example, the width of the spatula head member 20 parallel to the transverse axis 28 increases from about one inch at the rear end portion 26 to about four inches near the front edge 22.

The spatula head member 20 has an upper surface 23 and a lower surface 24. Referring to FIG. 2, the upper surface 23 is ideally tapered towards the lower surface 24 to form a tapered front edge 22. The tapered front edge 22 is then able to easily slide under delicate food, such as fish, without damaging the physical appearance of the food.

Ideally, the thickness of the spatula head member 20 is no more than about $\frac{1}{16}^{th}$ of an inch. Such a thin design, along with the tapered front edge 22, greatly aid in the sliding of the spatula head 20 between a piece of food and a cooking surface without damaging the food.

Also ideally, the spatula head member 20 is made of a flat piece of flexible yet resilient material such as a metal like stainless steel. Such flexibility allows the user to bear down on the spatula 10 to get under food without scratching the pan.

Preferably, a plurality of drainage slots 30 are extended through the spatula head member 20 and are provided substantially transversely between the spatula head lateral sides 25. Each drainage slot 30 has a front end 32 and a rear end 34. The drainage slot rear end 34 of each drainage slot 30 is extended towards the spatula head rear end portion 26. Also preferably, each drainage slot 30 is tapered towards each of their drainage slot rear end 34.

Referring to FIG. 3, a ridge 40 is upwardly extended from the spatula head upper surface 23. The ridge is designed to abut against food and halt its slide up the spatula 10. Preferably, the ends of the ridge 40 are extended transversely between the spatula head lateral sides 25. Also preferably, the ridge 40 is positioned along the drainage slot rear ends 34.

A handle member 50 is coupled to the rear end portion 26 of the spatula head member 20. Ideally, the handle member 50 is made out of a heat resistant material such as wood or plastic.

In use, the spatula 10 is grasped by the user at the handle member 50. Then the leading region 19 of the front edge 21 of the spatula head member 20 is placed against the surface of a piece of cookware or grill and slight downward pressure is applied to slightly bend the spatula head member 20 toward the cooking surface. The now arcuate spatula head member 20 will easily slide under the food without damaging the physical appearance of the food or scratching the surface of the cookware or grill.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A spatula, comprising:

a handle member;

a substantially planar spatula head member having a longitudinal axis, a transverse axis, a front edge, a pair of substantially straight lateral sides, a rear end portion, an upper surface, and a lower surface, said handle member being coupled to said rear end portion, said lateral sides being flared from said rear end portion towards said front edge such that said front edge has a front edge length greater than a length of said rear end portion, said length of said rear end portion being substantially equal to a width of said handle, said front edge being orientated at an angle from said transverse axis;

a plurality of drainage slots being extended through said spatula head member, each said drainage slot having a front end and a rear end, each said drainage slot rear end being extended towards said spatula head rear end portion, each said drainage slot being tapered towards said drainage slot rear end; and a substantially straight ridge being extended from said spatula head upper surface.

2. The spatula of claim 1, wherein said transverse axis is substantially perpendicular to said longitudinal axis.

3. The spatula of claim 1, wherein said angle said front edge is orientated from said transverse axis is between about 1 degree and about 50 degrees.

4. The spatula of claim 1, wherein the thickness of said spatula head member is no more than about $1/16^{th}$ of an inch to aid the sliding of said spatula head member between a piece of food and a cooking surface.

5. The spatula of claim 1, wherein said upper surface is tapered towards said lower surface at said front edge to aid the sliding of said spatula head member between a piece of food and a cooking surface.

6. The spatula of claim 1, wherein the ends of said ridge extend between said spatula head lateral sides.

7. The spatula of claim 1, wherein said drainage slots are provided substantially transversely between said spatula head lateral sides.

8. A spatula, comprising:

a handle member;

a substantially planar spatula head member having a longitudinal axis and a transverse axis, said transverse axis being substantially perpendicular to said longitudinal axis, said spatula head member having a front edge, a pair of substantially straight lateral sides and a rear end portion, said handle member being coupled to said rear end portion, said lateral sides being flared from said rear end portion to said front edge such that said front edge has a front edge length greater than a length of said rear end portion, said length of said rear end portion being substantially equal to a width of said handle, said front edge being orientated at an angle from said transverse axis, said spatula head member having an upper surface and a lower surface, said upper surface being tapered towards said lower surface at said front edge;

a plurality of drainage slots being extended through said spatula head member, each said drainage slot having a front end and a rear end, each said drainage slot rear end being extended towards said spatula head rear end portion, each said drainage slot being tapered towards said drainage slot rear end; and a ridge being upwardly extended from said spatula head upper surface, said ridge being extended transversely between said spatula head lateral sides.

* * * * *